(12) United States Patent
Thoelke et al.

(10) Patent No.: US 8,332,856 B2
(45) Date of Patent: Dec. 11, 2012

(54) DUAL MODE OPERATING SYSTEM FOR A COMPUTING DEVICE

(75) Inventors: Andrew Thoelke, Herts (GB); Dennis May, London (GB)

(73) Assignee: Nokia Corporation, Espoo (FI)

( * ) Notice: Subject to any disclaimer, the term of this patent is extended or adjusted under 35 U.S.C. 154(b) by 997 days.

(21) Appl. No.: 11/817,381

(22) PCT Filed: Mar. 1, 2006

(86) PCT No.: PCT/GB2006/000721
§ 371 (c)(1),
(2), (4) Date: Apr. 1, 2008

(87) PCT Pub. No.: WO2006/092589
PCT Pub. Date: Sep. 8, 2006

(65) Prior Publication Data
US 2009/0100429 A1   Apr. 16, 2009

(30) Foreign Application Priority Data
Mar. 2, 2005 (GB) .................................. 0504326.0

(51) Int. Cl.
G06F 9/46 (2006.01)
G06F 9/445 (2006.01)
(52) U.S. Cl. ........................................ 718/103; 718/104
(58) Field of Classification Search .................. None
See application file for complete search history.

(56) References Cited

U.S. PATENT DOCUMENTS

| 5,913,224 A | 6/1999 | MacDonald |
| 6,092,095 A | 7/2000 | Maytal |
| 6,321,272 B1 * | 11/2001 | Swales ........................... 709/250 |
| 6,470,071 B1 * | 10/2002 | Baertsch et al. ................ 378/62 |
| 6,825,832 B2 * | 11/2004 | Chung et al. .................... 345/168 |
| 7,451,447 B1 * | 11/2008 | Deshpande ....................... 718/102 |
| 7,457,822 B1 * | 11/2008 | Barrall et al. ......................... 1/1 |
| 2002/0078121 A1 * | 6/2002 | Ballantyne ...................... 709/102 |
| 2003/0120706 A1 | 6/2003 | Harjula |

FOREIGN PATENT DOCUMENTS

GB    2 389 747 A    12/2003
(Continued)

OTHER PUBLICATIONS

Search Report, dated Apr. 21, 2005, issued in corresponding GB Application No. GB 0504326.0.
(Continued)

Primary Examiner — Eric Coleman
(74) Attorney, Agent, or Firm — Alston & Bird LLP

(57) ABSTRACT

A computing device which runs non-pageable real time and pageable non-real time processes is provided with non-pageable real time and pageable non-real time versions of operating system services where the necessity to page in memory would block a real-time thread of execution. In one embodiment, a real time operating system service has all its code and data locked, and only supports clients that similarly have their code and data locked. This ensures that such a service will not block due to a page fault caused by client memory being unavailable. A non-real time operating system service does not have its data locked and supports clients whose memory can be paged out. In a preferred embodiment servers which are required to provide real time behaviour are multithreaded and arrange for requests from real time and non-real time clients to be serviced in different threads.

21 Claims, 2 Drawing Sheets

FOREIGN PATENT DOCUMENTS

| | | |
|---|---|---|
| JP | 03-126134 | 5/1991 |
| JP | 11-134204 | 5/1999 |
| JP | 2004-272479 | 9/2004 |
| WO | WO 98/09225 | 3/1998 |

OTHER PUBLICATIONS

Search Report, dated May 2, 2006, issued in corresponding GB Application No. GB 0604119.8.

Office Action, dated Jul. 31, 2008, issued in corresponding GB Application No. GB 0604119.8.

Translation of Second Office Action issued in connection with corresponding Chinese Application No. 200680006943.9; Dated: Jun. 5, 2009; 6 sheets.

Communication in connection with examination of corresponding European Application No. 06 709 945.7; Dated: Jun. 30, 2010; 4 sheets.

International Search Report issued in connection with International Application No. PCT/GB2006/000721; Mailed May 30, 2006; 3 sheets.

Web page downloaded from the following website: http://www.msdn.microsoft.com/en-us/library/ms920206(printer).aspx; Jul. 29, 2010; 1 sheet.

Web pages downloaded from the follow website: http://linux.die.net/man/2/mlock; Jul. 29, 2010; 4 sheets.

Siebert, F.; "JAVA in Real-time Applications"; Electronik Journal; vol. 52, No. 16, pp. 66-71; 2003; pp. 66-71; Published by WEKA Fachzeitschriften, Germany; ISSN: 0013-5658.

Ancillotti, P.; Buttazzo, G.; Di Natale, M.; and Spuri, M.; "TRACS: A Flexible Real-Time Environment for Traffic Control Systems"; IEEE; 1993; pp. 50-53.

Office Action from Japanese Office Patent Application No. 2007-557583, transmitted Jun. 27, 2012.

Edy Bertolissi et al., Java in Real-time Applications, IEEE Transactions on Nuclear Science, Aug. 1998, 1965-1971, vol. 45, No. 4, The Institution of Electrical Engineers, Stevenage, GB.

P. Ancilotti et al., TRACS: A Flexible Real-Time Environment for Traffic Control Systems, Proceedings of the IEEE Workshop on New York, NY, USA, May 13-14, 1993, Los Almitos, CA, USA, IEEE Comput. Soc. P. US., pp. 50-53—XP010032815.

* cited by examiner

DUAL MODE OPERATING SYSTEM FOR A COMPUTING DEVICE

CROSS REFERENCE TO RELATED APPLICATIONS

This application claims the priority of PCT/GB2006/000721 filed on Mar. 1, 2006 and GB 0504326.0 filed on Mar. 2, 2005, the entire contents of which are hereby incorporated in total by reference.

FIELD OF THE INVENTION

The present invention relates to a computing device, and in particular to a method for operating a computing device which can achieve real time performance for client-server and other inter-process communications in the device.

The term computing device as used herein is to be expansively construed to cover any form of electrical computing device and includes, data recording devices, computers of any type or form, including hand held and personal computers such as Personal Digital Assistants (PDAs), and communication devices of any form factor, including mobile phones, smart phones, communicators which combine communications, image recording and/or playback, and computing functionality within a single device, and other forms of wireless and wired information devices, including digital cameras, MP3 and other music players, and digital radios.

There is a hierarchy of memory types in computing devices; in general, the faster the memory, the more expensive it is. Computer scientists and software engineers have developed a number of techniques for making efficient use of the various types of memory in these devices. One of the main examples of this art is known as paging.

One of the most common forms of paging is 'demand paging', which is described in more detail below, but other paging algorithms, such as prepaging, are also possible. It is to be understood that this invention can also be used with these other paging algorithms, as appropriate.

Modern computing devices are able to address or reference large amounts of virtual memory: far in excess of what they actually have physically installed in the form of fast RAM (random access memory). For easy management this memory is often divided into blocks of fixed size, commonly known as pages; for example, 4K (4096 bytes) and various multiples thereof are common page sizes. Only a certain number of these pages (the exact number depends on how much memory the manufacturer of the device has chosen to provide) can be accommodated in primary RAM, and the remainder of the pages used are stored in some type of slower and cheaper secondary memory, such as a hard disk drive (HDD).

The total of all the addressable memory locations in use are termed 'virtual memory' and the computing device contains a mapping of virtual memory pages to physical memory pages. These mappings are known as page tables and, typically, these page tables are maintained by a memory management unit (MMU) which is implemented in hardware.

With demand paging, if an attempt is made to reference an address in a page of memory that is not held in RAM the MMU causes a page fault to occur. In this instance, the device temporarily halts processing while the relevant memory block is 'paged in' to RAM. This process involves copying the required page from slower and cheaper memory, typically the HDD, into RAM and updating the page tables in the MMU appropriately.

When a computing device has been running for some time, there will be no free memory into which a page can be copied because all of the physical RAM available in the computing device will already be in use. When this occurs, before a required block of memory can be paged in, the section of RAM into which it will be copied needs to be freed by using a reverse process, widely known in this art as paging out. Paging out usually involves copying a page from RAM back to the hard disk, or to whatever type of slower and cheaper secondary memory may be available, and updating the page tables in the MMU.

The decision as to which block of memory should be paged out is often a complex one; some of the simpler algorithms are to page out the least recently used (LRU) or least frequently used (LFU) block or blocks of memory.

It follows that in cases where the page has not changed since it was paged in, the copy step need not be performed. Unchanged pages are referred to as 'clean' pages while altered pages are referred to as 'dirty' pages; it is normal for the MMU to keep track of whether pages are clean or dirty by means of a flag associated with each page of physical memory.

There is a further advantage of paging when applied to mobile computing devices, which operate on a relatively restricted capacity battery source. Memory paging often enables considerable prolongation of battery life. Keeping blocks of memory on most types of secondary storage such as flash memory or small hard disks does not consume power when idle, but maintaining blocks of memory in volatile dynamic RAM does consume power, because dynamic RAM needs to be continually refreshed if it is not to lose its stored contents.

It is clear from the above description that, in a relative sense, the process of paging memory into and out of dynamic memory can occupy some considerable time. Aside from the necessity to manipulate page tables and work out which block of primary RAM needs to be paged out, the key factor is that paging in always requires a substantial amount of memory to be read from relatively slow secondary storage. Very often, pages will also need to be written to slow secondary storage. As an example, this would be necessary if the memory that is being paged out is flagged as dirty.

This timing burden on overall computing device operation is absolutely inevitable; if there was no speed difference between primary and secondary storage, there would be no hierarchy of memory within the device and paging would not be required.

The principal concern with the amount of time taken for paging is that this procedure can interfere with real time operations in the computing device; that is, operations that must be completed within a certain period of time to be completed correctly. Modern computing devices, especially those integrated into communications devices, such as smart phones, typically have to offer such real time guarantees for the devices to operate satisfactorily. For example, GSM mobile phones running signalling stacks need to track time slots which are only 577 microseconds in length. Thus, if a page fault occurs during an operation which seeks to make real time guarantees, these are liable to be broken if the operation becomes blocked until the memory required to be referenced is paged back in. The problem in practice is that there is no way of predicting when a page fault might occur, and when one does occur, how long the overall paging procedure will take to remedy the fault.

Because of this, it is now generally recognised that paging is not normally compatible with running a real time system in a computing device. This is because of the unpredictability of the occurrence of a page fault and because of the time it takes to read and write memory to and from relatively slow media storage after each page fault.

When a device depends on being able to offer real time guarantees, paging can either crash the device or render it useless; the aforementioned mobile phone stacks are an example of this, where failure to adhere to the constraints of the communication stacks can, in the worst case, cause calls to be dropped completely by the device. Where the real time guarantees are needed for perceived acceptable performance, paging can render applications unusable; attempts to handle streaming audio or video on a non-real time or 'slow' system demonstrate this perfectly.

Some operating systems which implement demand paging specifically state that it should not be used in a real time system. For example, Microsoft state in the Windows CE.Net documentation (http://msdn.microsoft.com/library/default.asp?url=/library/en-us/wcemain4/html/cmcondemandpaging.asp) that "because there is a penalty for using demand paging in a real time environment, it should be avoided."

Other operating systems attempt to ameliorate the problem. Documentation for the Linux mlock system call (http://linux.ctyme.com/man/man1739.htm) states that "Real time applications require deterministic timing . . . paging is one major cause of unexpected program execution delays."

The mlock Linux system call attempts to provide one solution for this problem in that it disables paging for a specific range of memory addresses. However, those skilled in the art of computer programming will readily recognise that a system which requires applications to know the memory addresses at which they load, together with the memory addresses of all the memory they reference (either directly or indirectly), the addresses of any system calls that they might need to use, together with the memory those calls reference, cannot be regarded as a practical solution for application development.

SUMMARY OF THE INVENTION

Therefore, it is an object of the present invention to provide an improved method of operating a computing device which is able to combine real time performance with memory paging.

According to a first aspect of the present invention there is provided a method of providing real time performance with memory paging in a computing device, the method comprising a. providing real time and non-real time versions of operating system services;
b. locking memory pages used for code and memory referenced by the real time versions of the said operating system services for preventing the said memory pages being paged out; and
c. causing real time applications, processes and threads to make use of the real time versions of the said operating system services.

According to a second aspect of the present invention there is provided a computing device arranged to provide real time performance with memory paging and comprising a. real time and non-real time versions of operating system services;
b. means for locking memory pages used for code and memory referenced by the real time versions of the said operating system services for preventing the said memory pages being paged out; and c. means for causing real time applications, processes and threads to make use of the real time versions of the said operating system services.

According to a third aspect of the present invention there is provided an operating system for causing a computing device according to the second aspect to operate in accordance with a method of the first aspect.

BRIEF DESCRIPTION OF THE DRAWINGS

An embodiment of the present invention will now be described, by way of further example only, with reference to the accompanying drawings in which:—

DETAILED DESCRIPTION OF THE INVENTION

Figure 1:
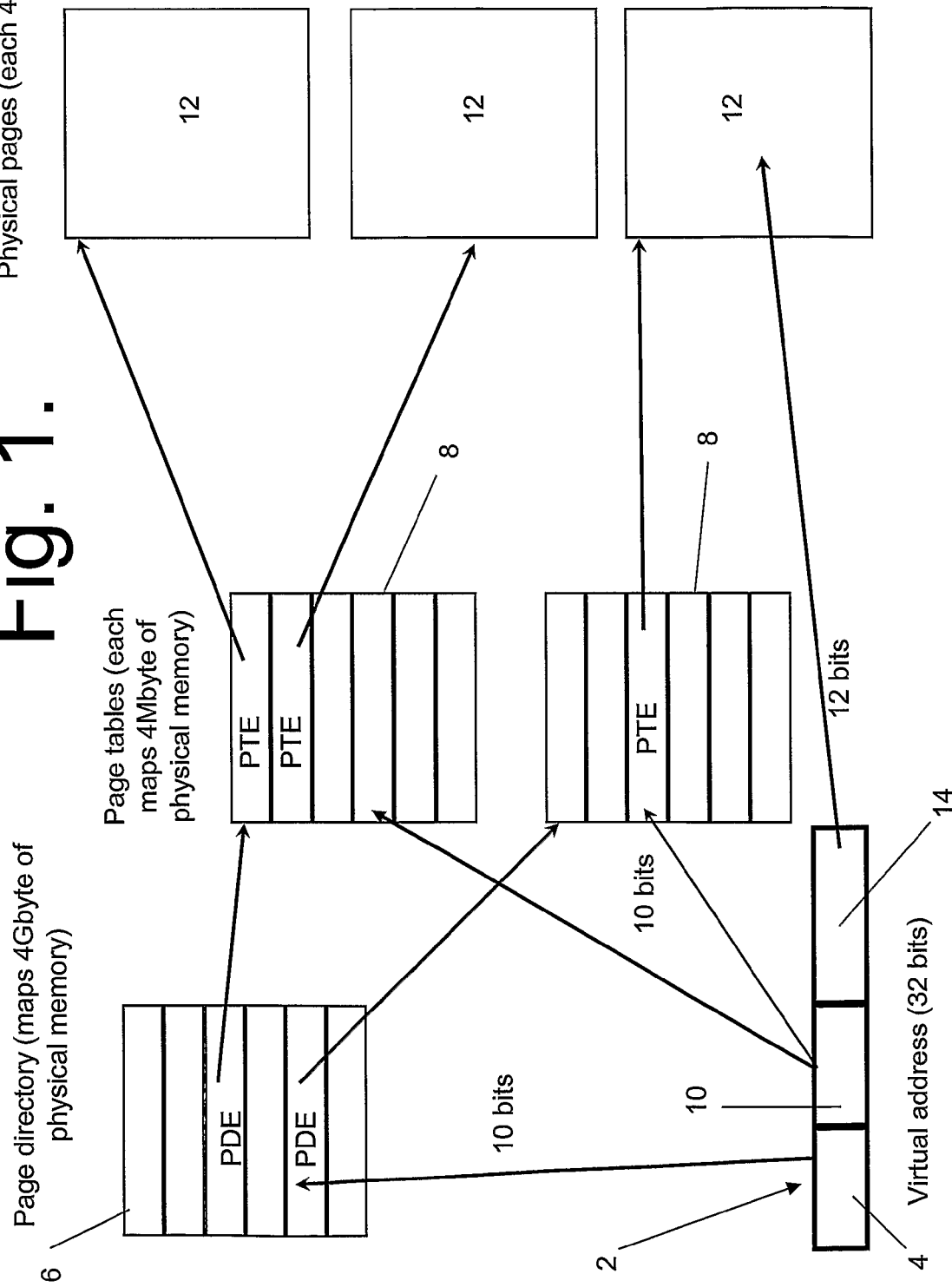
FIG. 1 illustrates schematically a method of demand paging in a computing device.

FIG. 1 illustrates schematically how demand paging may be carried out.

It is very common for the MMU of a computing device to convert virtual memory addresses to physical memory addresses by means of one or more Translation Lookaside Buffers (TLBs).

FIG. 1 shows an example of how this can be achieved in the case of a two level page table implementation based on 4K pages, as implemented in Intel™ x86 and many ARM™ processors. On these processors, the MMU converts a 'virtual' 32 bit address 2, which can map four gigabytes of 'virtual' address space within memory, to a 'physical' 32 bit address by a series of table look-ups.

The most significant ten bits 4 of the virtual address 2 index into a 4 k table 6, known as the Page Directory, which comprises of 1024 32 bit values. Each of the 32 bit values of the Page Directory table 6 is known as a Page Directory Entry (PDE). The PDE indexed by the most significant ten bits of the virtual address 2 is a (virtual) pointer to another 4 k table 8 of 32 bit entries, known as a Page Table. The 32 bit entries of the Page Table are known as Page Table Entries (PTEs). Each page table can map four megabytes of physical memory. Thus, if the whole of the 4 gigabyte virtual address space was backed with physical memory, there would be one Page Table for each PDE: namely 1024 Page Tables. However, the Page Directory only needs to contain sufficient entries to map the actual physical memory addresses available on the device. Hence, in a device having, for example, 16 Mb of physical memory, four page tables would be required.

The next most significant ten bits 10 of the virtual address 2 index directly into the Page Table 8 mapped by the PDE indexed by the ten most significant bits 4 of the virtual address 2, giving a 32 bit value which is the start address of a 4K physical page 12.

The remaining, or least significant, twelve bits 14 of the virtual address 2 pass straight through the above translation mechanism to select a byte within the 4 k physical page 12 addressed by the 32 bit value (PTE) from the respective page table 8. Hence, it can be seen that by using a Page Directory and Page Tables as shown in FIG. 1, the 32 bit virtual address can be used to select any byte within the memory pages of the physical memory of the computing device.

The present invention is based on the perception that the problems described above are not mostly caused by the fact that portions of a running process are liable to become paged out. In fact, marking the pages used by any single process containing a real time thread as being subject to real time constraints and which should therefore not be paged out is not difficult for those skilled in the art to implement. Such marking can, for example, be performed automatically at process creation time by the operating system kernel (which is that privileged part of the operating system responsible for creating threads and processes and enforcing process boundaries) provided a facility such as the Linux mlock system call referred to above is available. Other necessary steps, such as ensuring that real time threads are coded in such a way that they will fit into physical memory and therefore will not need to be paged out are similarly not overly complex design solutions for those skilled in this art.

Additionally, the present invention is based on the perception that what actually causes the most problems for real time processes in a computing device implementing paging is that, like all processes running on modern computing devices, they rely on operating system services, which are essentially available to all processes, whether real time or not. It is these common services which are liable to be blocked by demand paging, thereby affecting the real time capabilities of processes. In cases where access to these common services is mediated by the operating system kernel but not actually provided by the kernel, problems are particularly likely to be manifest, because there is a no easy solution for ensuring that memory pages referenced outside the kernel will not be paged out.

Figure 2:
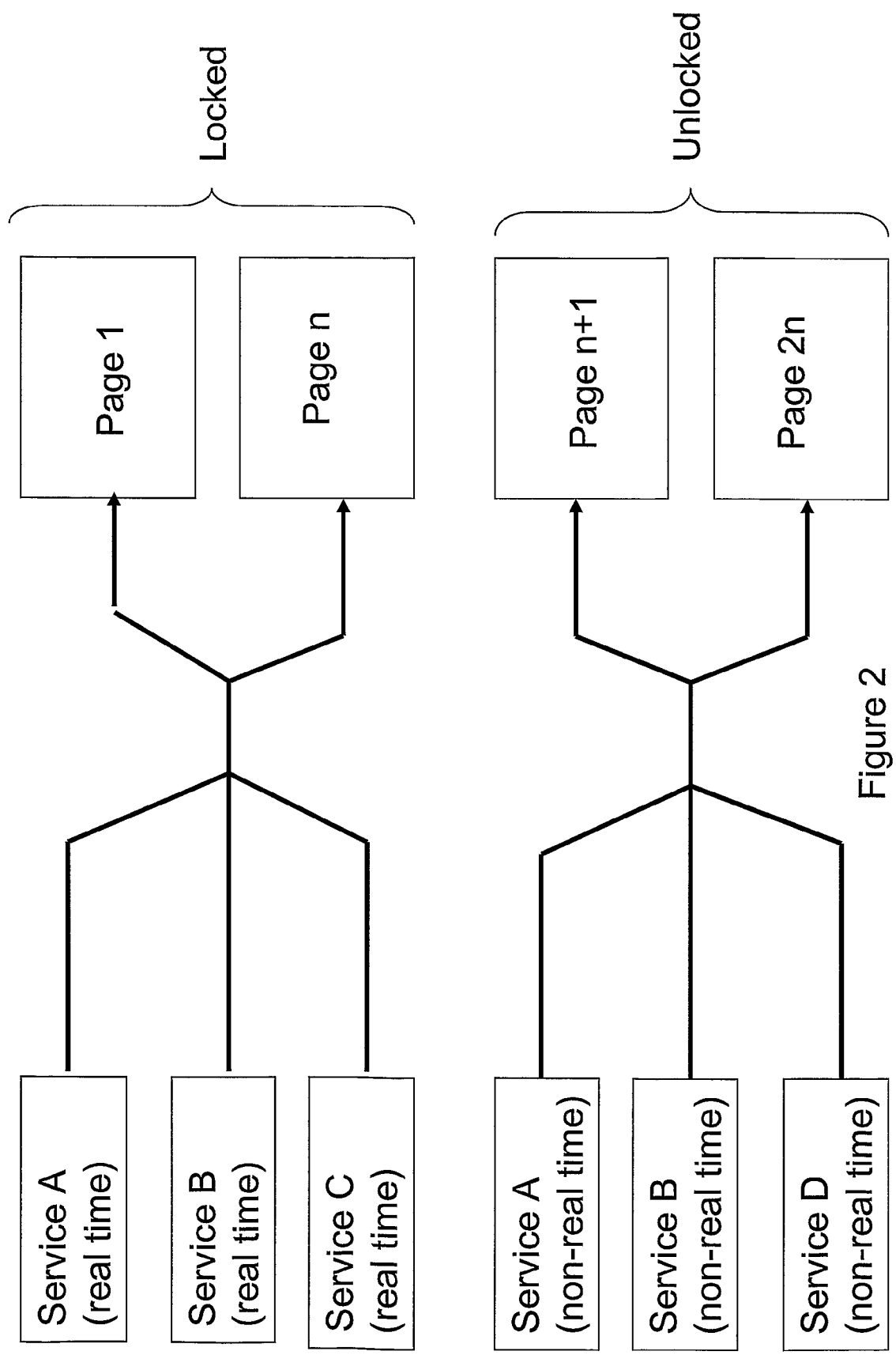
FIG. 2 illustrates schematically a scheme for providing real time performance with memory paging in a computing device in accordance with the present invention.

The solution provided by the present invention is to introduce two different versions of any common services that are used by both real time and non-real time applications, processes and threads, as shown in FIG. 2. These applications, processes and threads are referred to collectively in the following description as processes:

The version of the service that is used by real time processes will have all of its memory pages locked, together with any user memory pages which it may need to reference. Because locking such pages prevents them being paged out, this version of the operating system service will not encounter a page fault. Real time processes on the computing device can, therefore, be arranged advantageously to make use of this version.

The second version of the service is for use by non-real time processes, and does not have any of its memory pages locked, neither does the service lock the user memory pages which it references. This version can encounter page faults; but since it is not used by any real time processes, it does not matter if it blocks temporarily while memory is being paged in or out.

FIG. 2 shows, schematically, an embodiment of the present invention providing such a solution. In FIG. 2, Service A and Service B are both used by real time and non-real time processes. Hence, with the present invention, two versions of these services are provided within the device operating system, Service A (real time) and Service A (non-real time), and likewise for Service B. Service C shown in FIG. 2 is used only by real time processes and Service D is used only by non-real time processes so only one version of each of these services is provided.

The high level physical RAM memory is shown in FIG. 2 as having 2n pages, and in this embodiment pages 1 to n are locked and pages n+1 to 2n are unlocked. All of the services that are used by real time processes, namely Services A (real time), B (real time) and C, are only associated with the locked pages 1 to n of the RAM whereas the services that are used only by non-real time processes, namely Service A (non-real time), Service B (non-real time), and Service D, are associated only with the unlocked pages n=1 to 2n of the RAM.

Hence, it can be seen that by providing two versions for the services used by real time and non-real time processes, and ensuring that the versions serving the real time processes are only associated with locked memory that is paged in, a real time service can always be assured for the real time processes that use these services.

A TCP/IP communications stack is one example of a common service where the present invention would be of use because such a stack can have real and non-real time clients.

As a practical example, one of the clients of such a stack might be a printing program which, for the purpose of this explanation, is assumed to have sent a large quantity of print data to a printer. For such programs it is usual for the data to be held temporarily in local memory, and then for this data to be sent from the local memory for actual printing. However, some sort of data flow control is nearly always used in such provider/consumer relationships, since computing devices can usually transmit data faster than a physical device which is to use the data, such as a printer, can actually process received data. Furthermore, the printer will periodically run out of its finite consumable supplies, such as paper or ink. For whatever reason then, the printer is likely at some point in time to signal the communications stack to stop sending data for an indeterminate period of time, which could in practice be long enough to trigger a quite sensible decision to page out the print data from the pages of primary memory in which it is being held temporarily to secondary storage, such as the device hard disk. Therefore, the printer operation interruption causes delays in processing the print data but these are to an extent acceptable to a user because there is a known expectation that the printer cannot operate infinitely without manual replenishment of its consumable supplies However, another client of the same TCP/IP communications stack might be handling a real time multimedia data stream, such as a voice over IP telephone call for a device user. In this instance the user would most certainly notice if there were either long delays in processing data or if data were lost because the real time client could not meet its required real time track time slots.

However, it is clear that in the above case with a shared (real time and non-real time) service being provided by the same TCP/IP communications stack, that if the data sent by the printing program (non real time client) had been paged out while the printer was unable to print, a change in the status of the printer and a request for more data would cause a page fault. This would block the stack to all clients, whether real time or non real time, while the print data is paged back in. This would quite likely cause judders or even lost data in the processing of the incoming real time multimedia data stream to the TCP/IP stack because the stack is blocked and could not process the incoming data. Both of these would be unacceptable to the user.

If, on the other hand, two TCP/IP communication stacks are provided, one version of which is designed for non-real time processes, such as printing, and the other of which is designed for and access restricted to real time processes such as Internet telephony, then a page fault in the non-real time stack as described above would not be able to block the real time stack. Hence, the real time process would continue to run irrespective of any interruption in the non-real time process.

If all applications running on the computing device are well-behaved, there is no problem with not restricting access to real time operating services to real-time services. However, on open devices, especially those where third party software can be loaded on to the system, it is further desirable to enforce the restriction by offering a means of allowing real-time operating system services to check that clients either have real-time priority or some sort of real-time capability. The latter is preferable, as many operating systems allow threads to alter their priority at various times as they execute. A suitable mechanism for enforcing such a real time capability is described in the capability based execution model disclosed in GB 2389747 entitled "Secure Mobile Wireless Device".

An alternative embodiment for this invention may be arranged to multithread those operating system services which are required to provide real time behaviour, and arranging that requests from real time non-pageable and non-real time pageable clients are serviced in different threads.

It will be appreciated that this invention is capable of application to any computing device incorporating any type of memory paging, irrespective of how it decides which memory should be paged, and when. It is stressed that the present invention is not restricted to demand paging: those skilled in the art will observe that this invention is concerned with stopping specific pages from being paged out, not with deciding which pages should be paged in.

From the above, it can be seen that a key advantage of this invention is that it enables a computing device to make use of paging to efficiently manage a hierarchy of memory types with different performance and cost characteristics without impacting the ability of the device to run real time software which makes hard timing guarantees.

Although the present invention has been described with reference to particular embodiments, it will be appreciated that modifications may be effected whilst remaining within the scope of the present invention as defined by the appended claims.

The invention claimed is:

1. A method comprising:
   a. providing a plurality of operating system services, including providing both a real time version and a corresponding non-real time version of each of the plurality of operating system services used both by a real time application, process, or thread and by a non-real time application, process or thread;
   b. locking memory pages used for code and memory referenced by the real time versions of the said operating system services for preventing the said memory pages being paged out;
   c. causing real time applications, processes and threads to make use of the real time versions of the said operating system services; and
   d. causing non-real time applications, processes and threads to make use of the non-real time versions of said operating system services.

2. A method according to claim 1 in which applications, processes and threads which do not have real-time priority are not permitted access to the real time versions of the operating system services.

3. A method according to claim 1 in which access to an operating system service by an application, process or thread is routed to either the real-time or non-real time version of that service depending at least in part on the capability or equivalent run-time permission of the application, process or thread.

4. A method according to claim 1 in which access to an operating system service by an application, process or thread is routed to either the real-time or non-real time version of the service depending at least in part on the priority of the application, process or thread.

5. A method according to claim 1 in which the real time and non-real time versions of at least one of the said operating system services are provided as separate threads of execution in a single multithreaded process.

6. A method according to claim 1 in which at least one of the operating system services is implemented as a server.

7. An apparatus comprising at least one processor and at least one memory storing computer program code, wherein the at least one memory and stored computer program code are configured, with the at least one processor, to cause the apparatus to at least perform:
   a. providing a plurality of operating system services, including providing both a real time version and a corresponding non-real time version of each of the plurality of operating system services used both by a real time application, process, or thread and by a non-real time application, process or thread;
   b. locking memory pages used for code and memory referenced by the real time versions of the said operating system services for preventing the said memory pages being paged out;
   c. causing real time applications, processes and threads to make use of the real time versions of the said operating system services; and
   d. causing non-real time applications, processes and threads to make use of the non-real time versions of said operating system services.

8. An apparatus according to claim 7 wherein the at least one memory and stored computer program code are configured, with the at least one processor, to further cause the apparatus to perform:
   preventing applications, processes and threads which do not have real-time priority from accessing a real time version of an operating system.

9. An apparatus according to claim 7 wherein the at least one memory and stored computer program code are configured, with the at least one processor, to further cause the apparatus to perform:
   routing access to an operating system service by an application, process or thread to either the real-time or non-real time version of that service depending at least in part on the capability or equivalent run-time permission of the application, process or thread.

10. An apparatus according to claim 7 wherein the at least one memory and stored computer program code are configured, with the at least one processor, to further cause the apparatus to perform:
    routing access to an operating system service by an application, process or thread to either the real-time or non-real time version of the service depending at least in part on the priority of the application, process or thread.

11. An apparatus according to claim 7 wherein the at least one memory and stored computer program code are configured, with the at least one processor, to further cause the apparatus to perform:
    providing the real time and non-real time versions of at least one of the said operating system services as separate threads of execution in a single multithreaded process.

12. An apparatus according to claim 7 wherein at least one of the operating system services is implemented as a server.

13. An apparatus according to claim 7 wherein the stored computer program code comprises an operating system.

14. An apparatus according to claim 7, wherein the apparatus is a mobile phone.

15. A computer program product comprising at least one non-transitory computer-readable storage medium having computer-readable program code portions stored therein, the computer-readable program code portions comprising:
    a program code portion configured to provide a plurality of operating system services, the program code portion being configured to provide both a real time version and a corresponding non-real time version of each of the plurality of operating system services used both by a real time application, process, or thread and by a non-real time application, process or thread;

a program code portion configured to lock memory pages used for code and memory referenced by the real time versions of the said operating system services for preventing the said memory pages being paged out;

a program code portion configured to cause real time applications, processes and threads to make use of the real time versions of the said operating system services; and a program code portion configured to cause non-real time applications, processes and threads to make use of the non-real time versions of said operating system services.

16. The method of claim 1 wherein said operating system services comprise a Transmission Control Protocol/Internet Protocol (TCP/IP) communications stack.

17. The apparatus of claim 7 wherein said operating system services comprise a Transmission Control Protocol/Internet Protocol (TCP/IP) communications stack.

18. The method of claim 1 wherein the real time operating system services determine whether the application, process or thread does or does not have a real-time capability or equivalent run-time permission.

19. The apparatus of claim 7 wherein the real time operating system services determine whether the application, process or thread does or does not have a real-time capability or equivalent run-time permission.

20. The method of claim 1, further comprising preventing an application, process or thread from accessing a real time version of an operating system service in an instance in which the application, process or thread does not have a real-time capability or equivalent run-time permission.

21. The apparatus of claim 7, wherein the at least one memory and stored computer program code are configured, with the at least one processor, to further cause the apparatus to perform preventing an application, process or thread from accessing a real time version of an operating system service in an instance in which the application, process or thread does not have a real-time capability or equivalent run-time permission.

* * * * *